Figure 6:
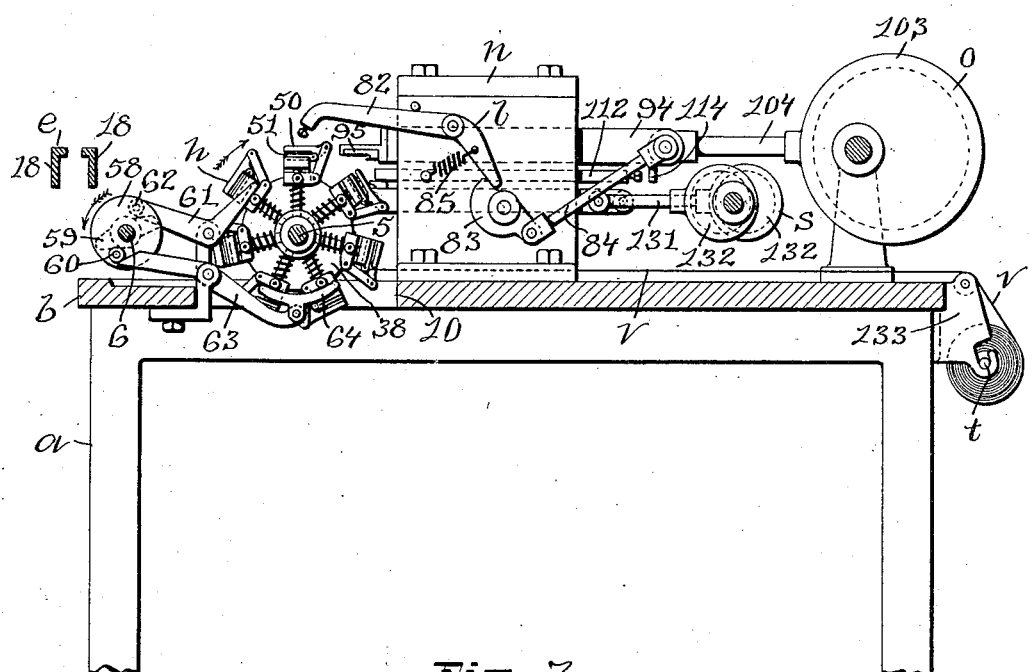

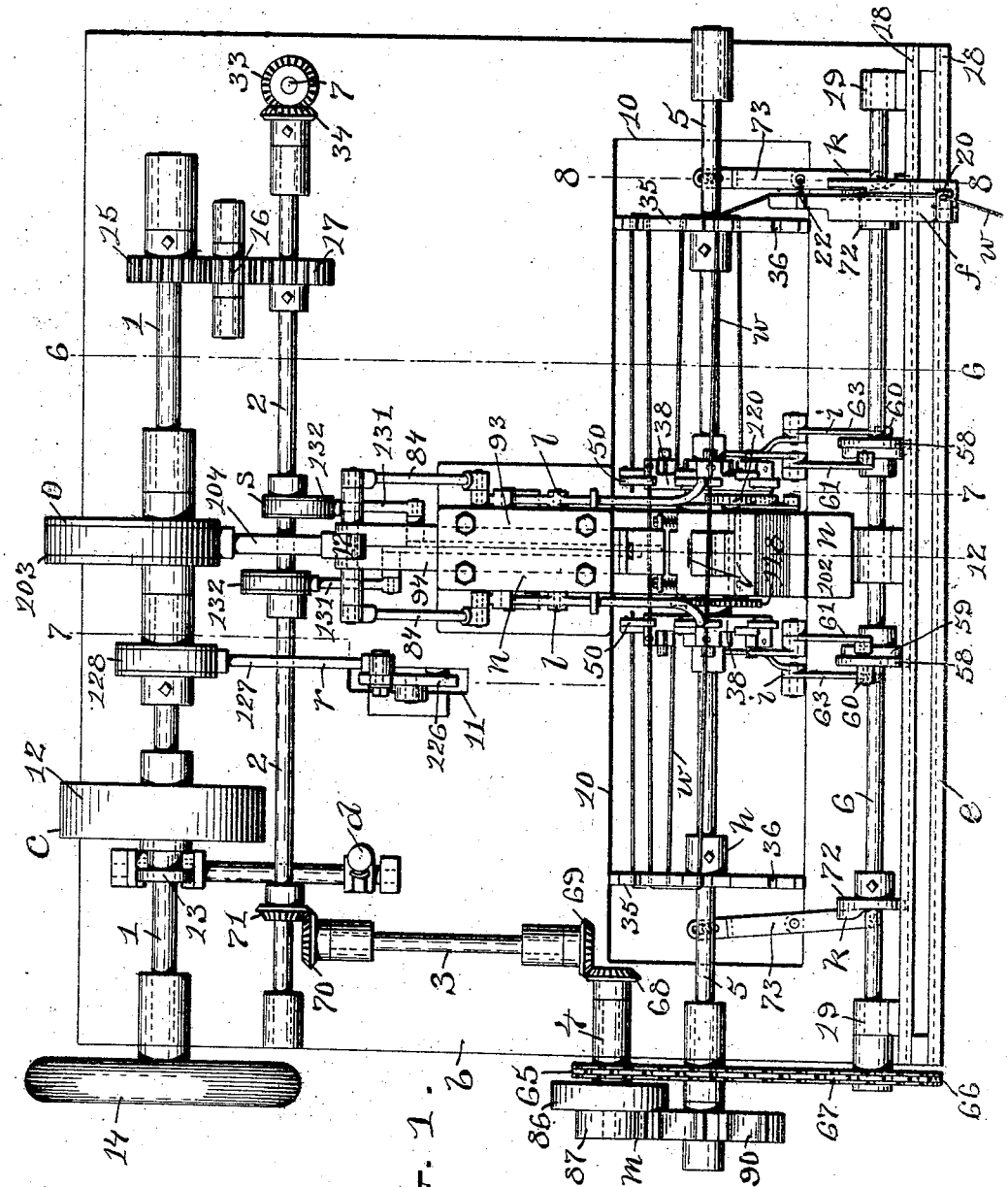

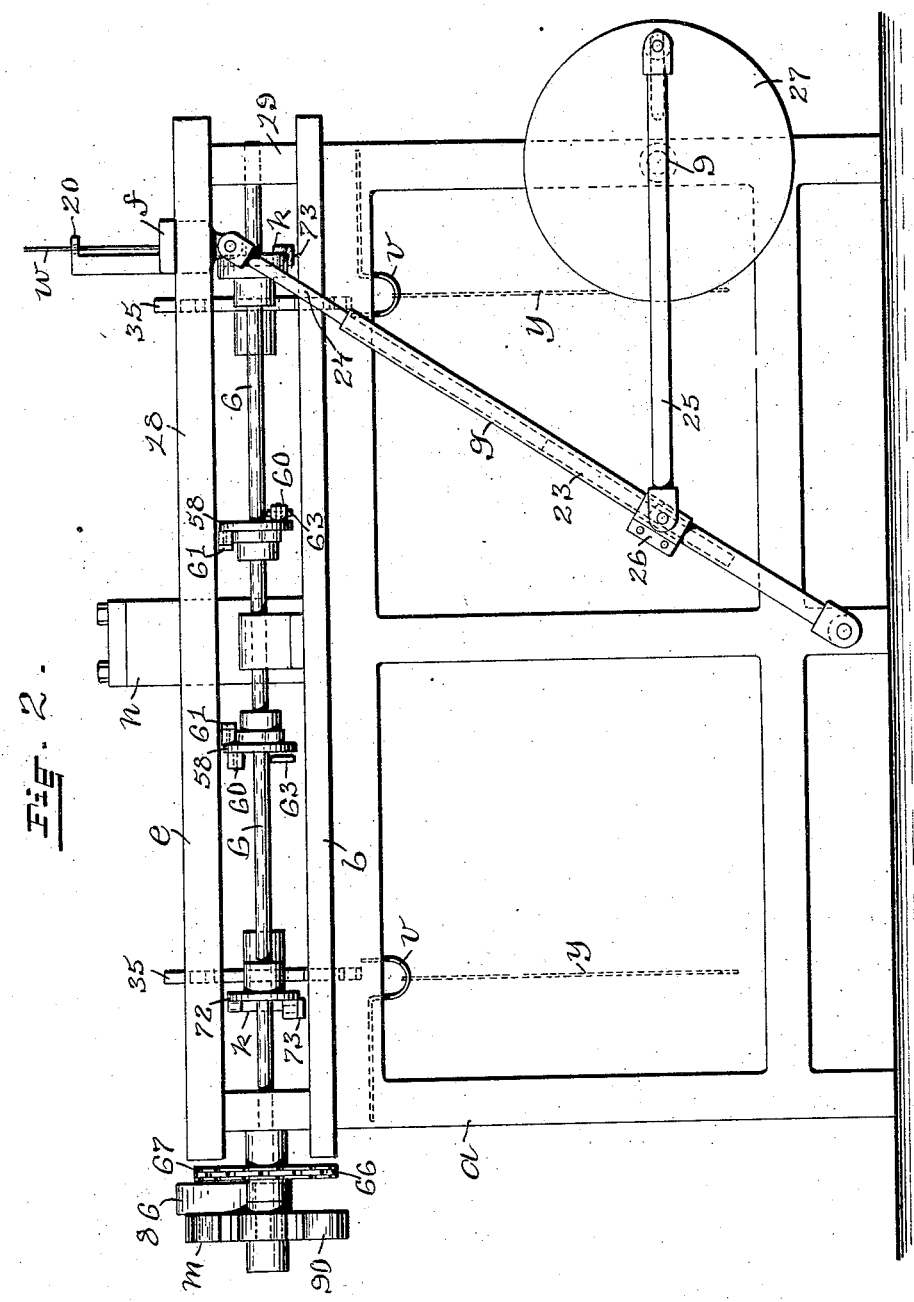

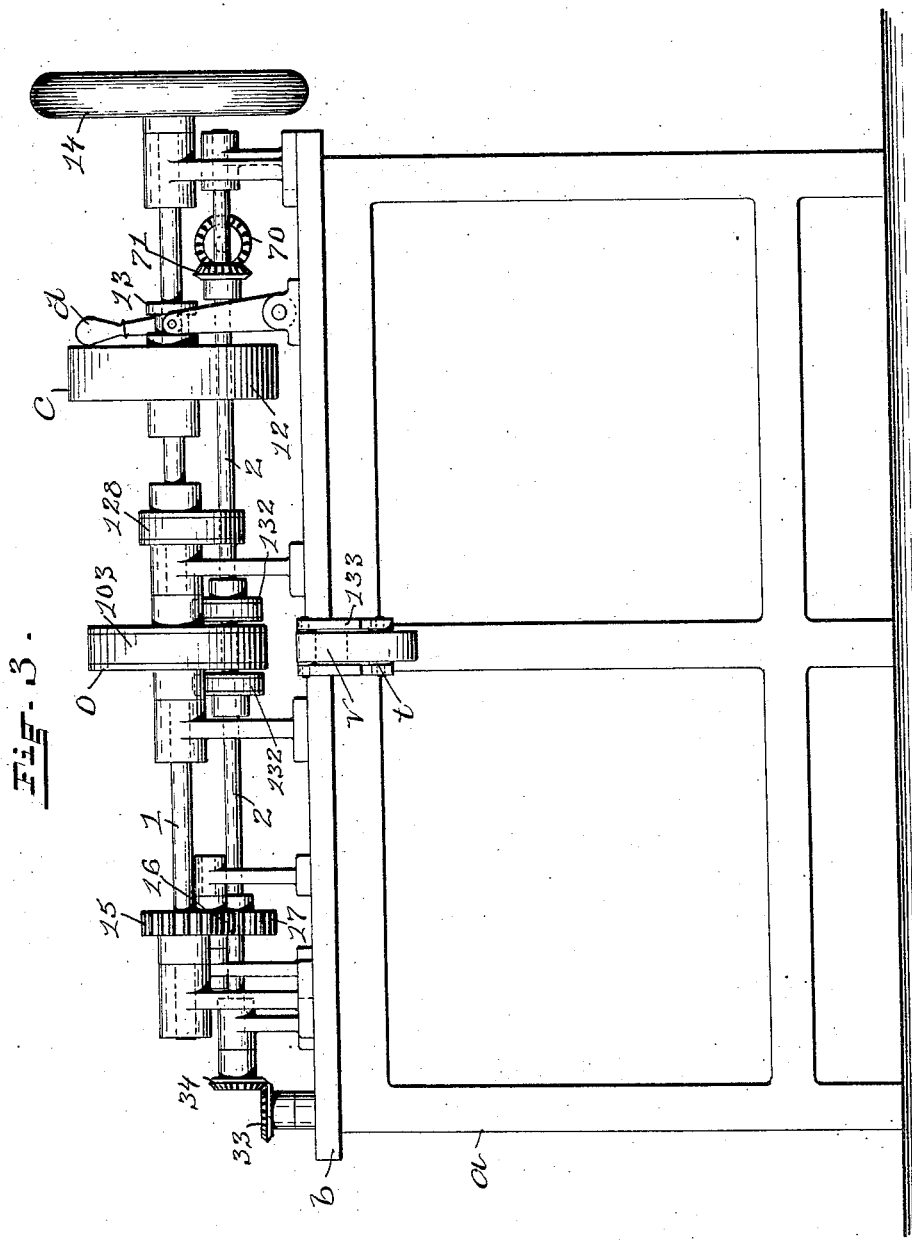

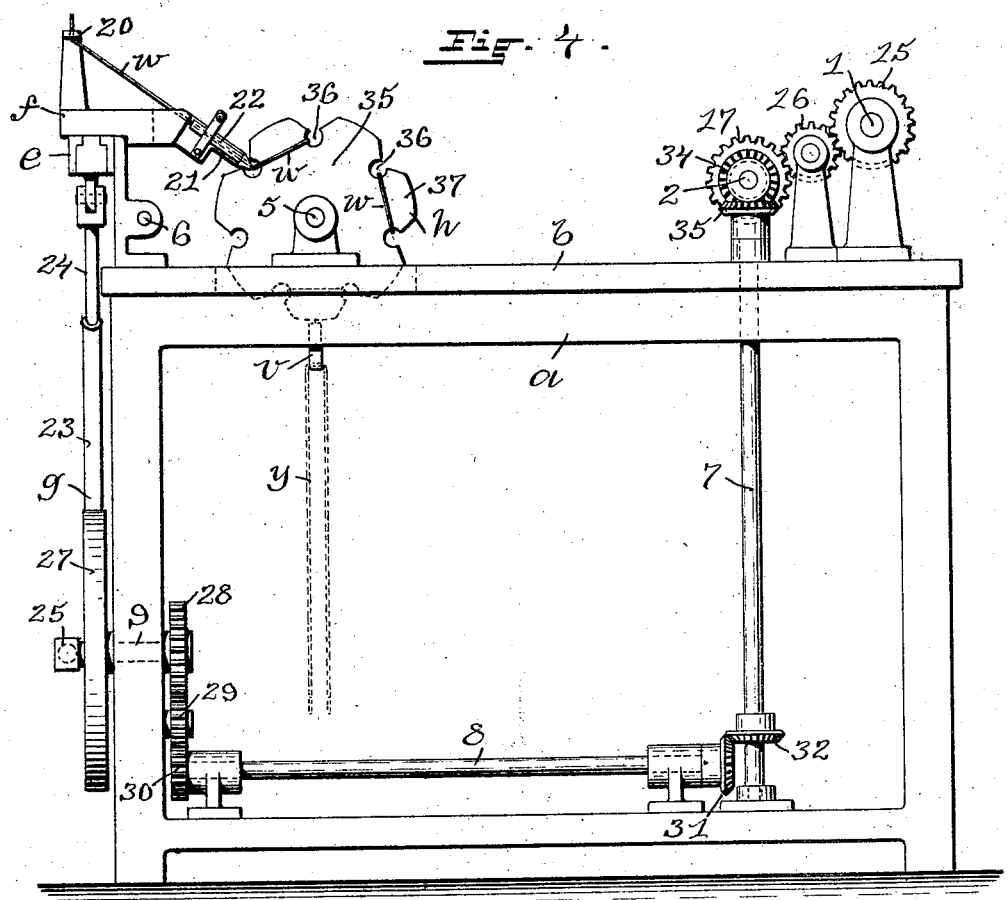

No. 895,724.

PATENTED AUG. 11, 1908.

W. H. CHURCH.
MACHINE FOR MANUFACTURING SHOE OR SIMILAR LACINGS.
APPLICATION FILED JAN. 4, 1908.

10 SHEETS—SHEET 5.

WITNESSES:
Ada E. Hagerty
Eleanor R. Ryder

INVENTOR:
William H. Church
by Joseph H. Miller
ATTORNEY

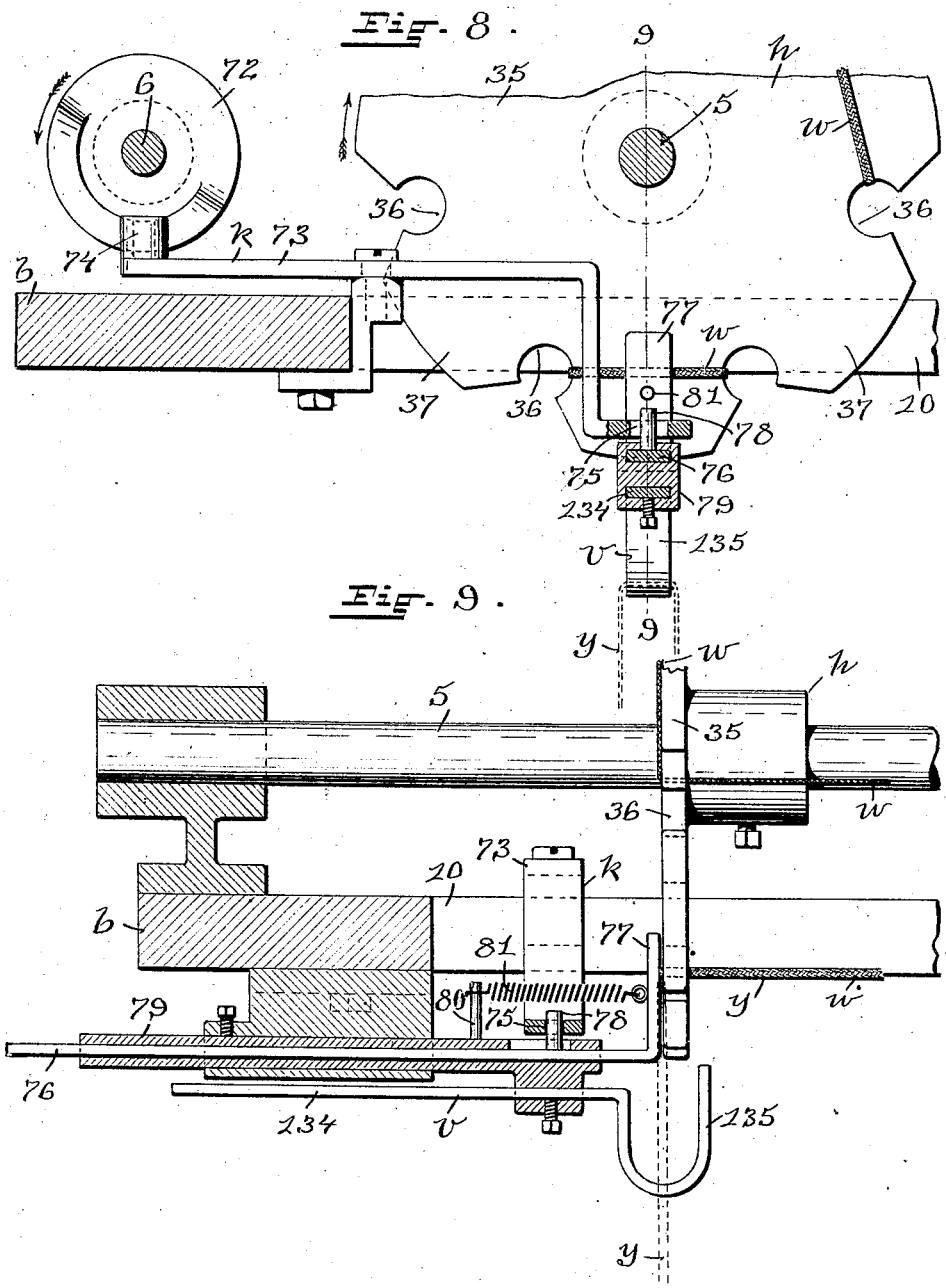

No. 895,724. PATENTED AUG. 11, 1908.
W. H. CHURCH.
MACHINE FOR MANUFACTURING SHOE OR SIMILAR LACINGS.
APPLICATION FILED JAN. 4, 1908.
10 SHEETS—SHEET 7.
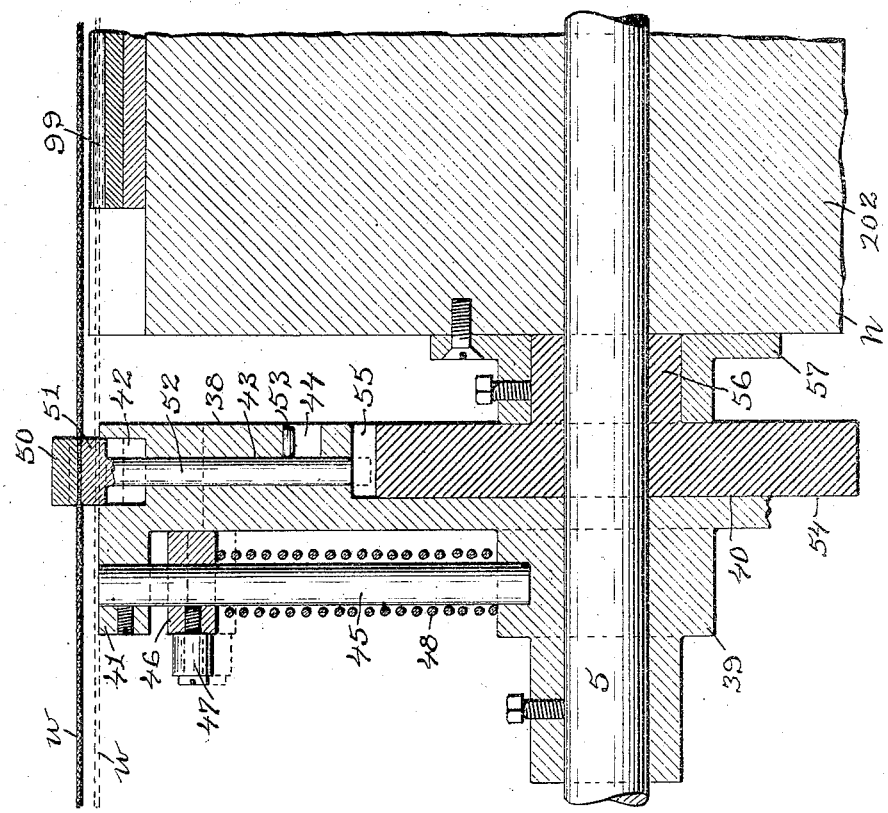
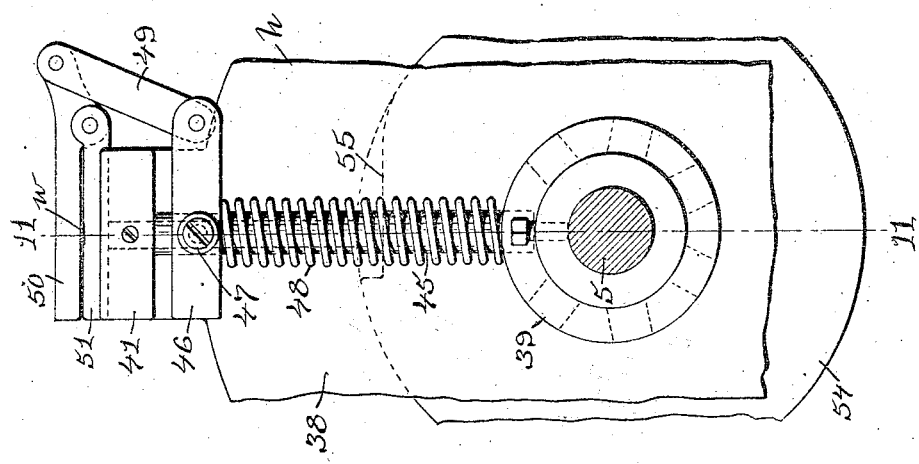
WITNESSES:
Ada E. Hagerty
Eleanor G. Ryder.
INVENTOR:
William H. Church
by Joseph A. Miller
ATTORNEY.

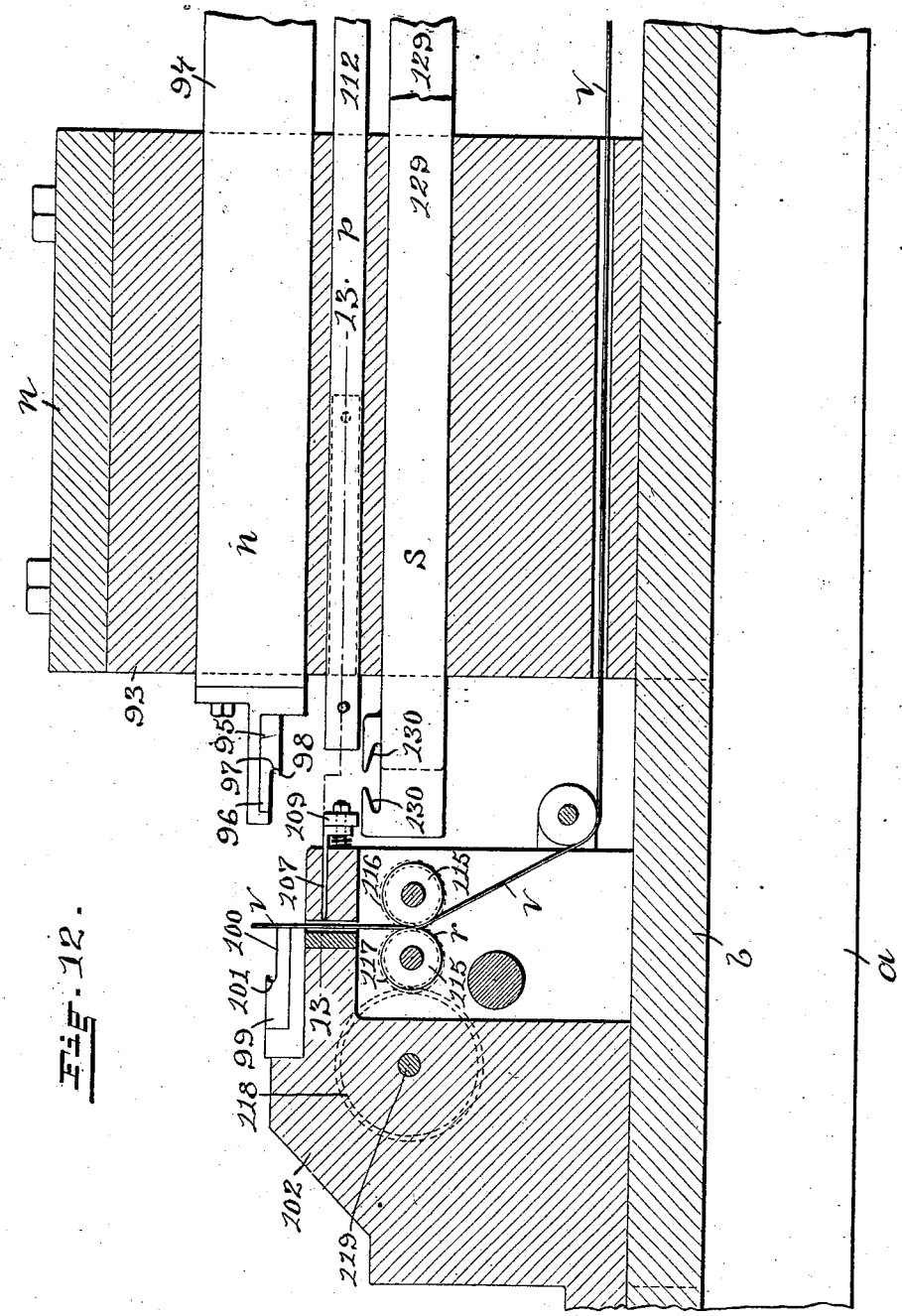

No. 895,724. PATENTED AUG. 11, 1908.
W. H. CHURCH.
MACHINE FOR MANUFACTURING SHOE OR SIMILAR LACINGS.
APPLICATION FILED JAN. 4, 1908.

10 SHEETS—SHEET 9.

WITNESSES:
Ada E. Hagerty
Eleanor R. Ryder.

INVENTOR:
William H. Church
by Joseph A. Miller
ATTORNEY.

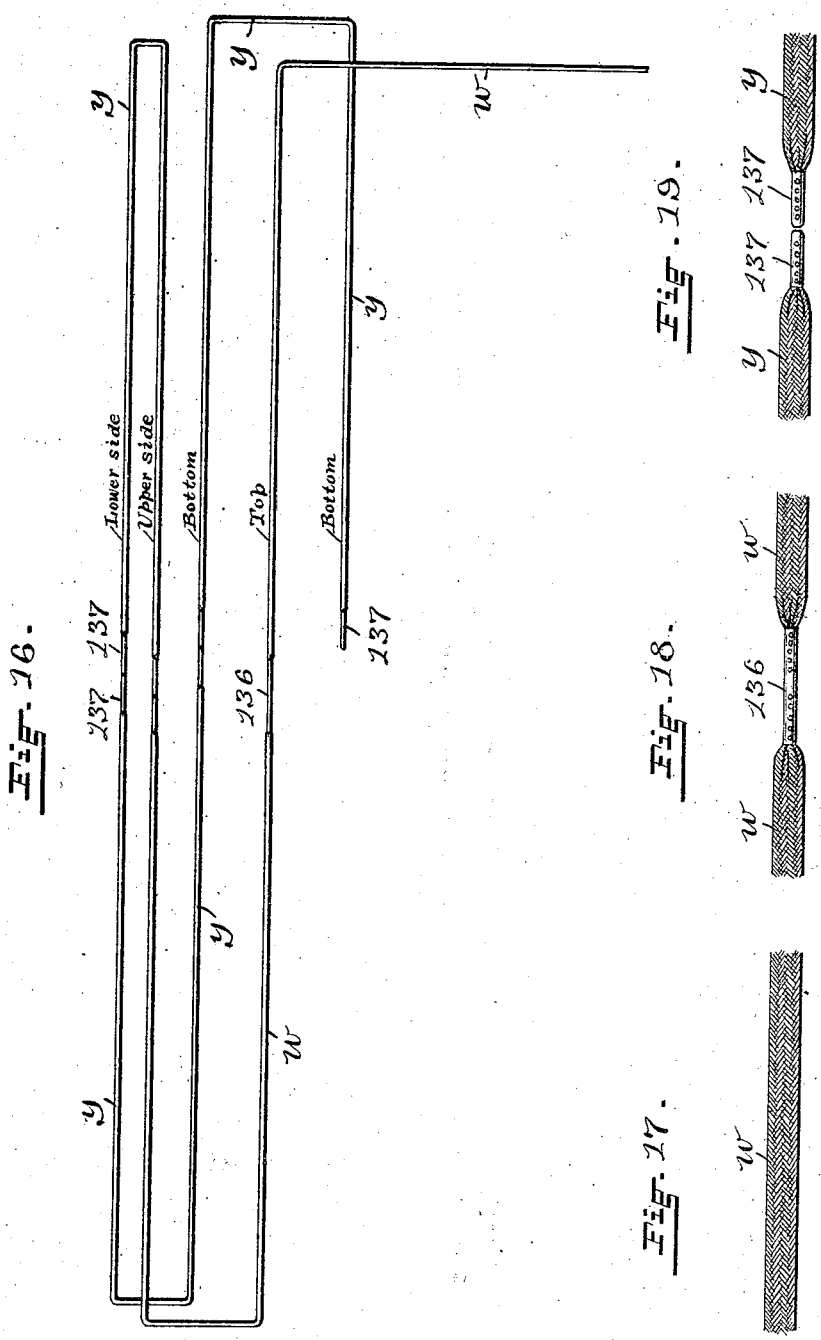

UNITED STATES PATENT OFFICE.

WILLIAM H. CHURCH, OF PAWTUXET, RHODE ISLAND, ASSIGNOR TO PROVIDENCE TIPPING MACHINE COMPANY, OF PROVIDENCE, RHODE ISLAND.

MACHINE FOR MANUFACTURING SHOE OR SIMILAR LACINGS.

No. 895,724.

Specification of Letters Patent.

Patented Aug. 11, 1908.

Application filed January 4, 1908. Serial No. 409,346.

*To all whom it may concern:*

Be it known that I, WILLIAM H. CHURCH, a citizen of the United States, residing at Pawtuxet, in the county of Providence and State of Rhode Island, have invented a new and useful Improvement in Machines for Manufacturing Shoe or Similar Lacings, of which the following is a specification.

This invention has reference to an improvement in machines used in the manufacture of shoe, or other lacings and more particularly to an improvement in machines adapted to automatically tip shoe, corset or similar lacings.

The objects of my invention are to improve the product, increase the production and lessen the cost of manufacturing shoe, corset or similar lacings, and I accomplish these objects by providing a machine with mechanism adapted to reciprocally feed a continuous strip of lacing material into the machine the length of one lacing for each reciprocating movement of the lacing material, feed a ribbon of tip stock, indenture the tip stock, cut and apply a double metal tip to the strip of lacing material, give an intermittent transverse motion to the double tipped strip of lacing material in a circular direction, cut the double tip centrally and direction, cut the double tip centrally and the strip of lacing material, thereby forming a tip on each end of the severed lacing material, hold the tipped ends of the lacing, hold the lacing centrally, release the tipped ends of the lacing, release the completed lacing and allow the same to fall onto a lacing receiving hook, all in one operation of the machine.

A further object of my invention is to provide an automatic machine that will manufacture shoe, corset or similar lacings having a more uniform length and a more undeviating length of tip than has heretofore been done.

The figures in the drawings are all shown with the operative parts in the position they would assume at the start of one operation of the machine to manufacture a complete shoe, corset or similar lacing.

Figure 7:
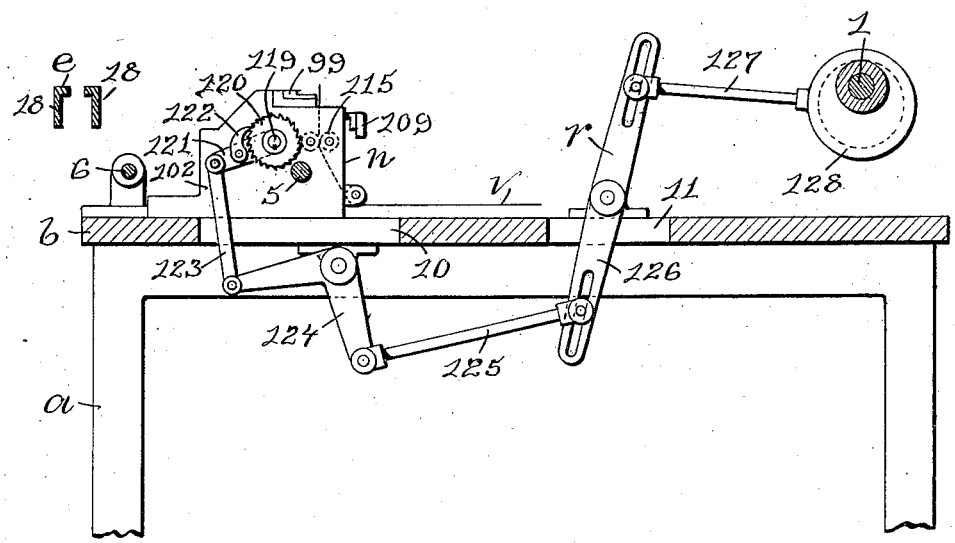
Figure 13:
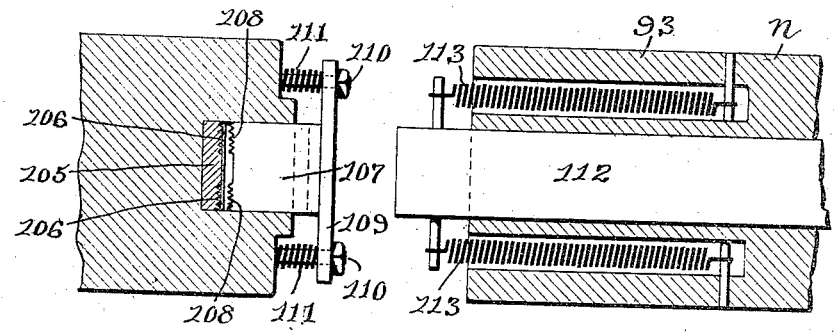
Figure 14:
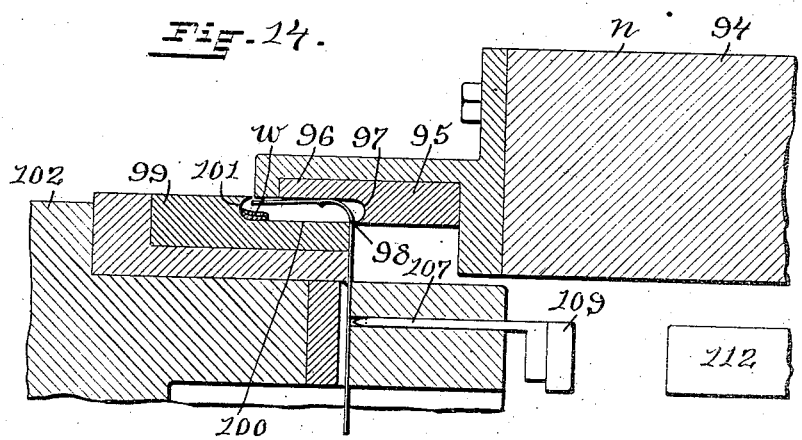

Figure 1 is a top plan view of my improved automatic machine for manufacturing shoe lacings, showing a strip of lacing material in the machine in the process of being manufactured into shoe lacings. Fig. 2 is a front view of the machine, showing the mechanism for giving a reciprocating feed motion to the strip of lacing material and the lacing receiving hooks at each end of the machine on which the completed lacings are alternately dropped. Fig. 3 is a view looking at the back of the machine, showing the driving mechanism and the location of the roll of tip stock. Fig. 4 is a right hand end view of the machine, showing the means for connecting the reciprocating feed motion mechanism with the driving mechanism. Fig. 5 is a left hand end view of the machine, showing the frame below the bed broken away and the means for giving an intermittent rotary motion to the lacing carrying mechanism. Fig. 6 is a vertical sectional view taken on line 6 6 of Fig. 1, showing the lacing clamping jaws in the lacing carrying mechanism and the means for operating the same. Fig. 7 is a vertical sectional view taken on line 7 7 of Fig. 1, showing the tip stock feed mechanism. Fig. 8 is an enlarged detail sectional view taken on line 8 8 of Fig. 1, showing the mechanism for holding the completed lacing centrally and for releasing the same, thereby allowing the completed lacing to drop onto a lacing receiving hook. Fig. 9 is an enlarged detail sectional view taken on line 9 9 of Fig. 8, showing the construction of the lacing holding mechanism and the means for adjustably securing the lacing receiving hook in a position to receive the completed lacing. Fig. 10 is an enlarged detail view of part of the lacing carrying mechanism looking at one of the lacing clamping jaws and showing the same in the closed position. Fig. 11 is an enlarged detail sectional view taken on line 11 11 of Fig. 10, showing the normal position of the strip of lacing material in full lines and the position the same would assume, when depressed into the tip forming dies, in broken lines. Fig. 12 is an enlarged vertical sectional view taken on line 12 12 of Fig. 1, showing the tip stock feed rolls, the tip stock indenturing dies, the double tip forming dies and the cutter for cutting the double tip centrally. Fig. 13 is an enlarged horizontal sectional view taken on line 13 13 of Fig. 12, showing the tip stock indenturing dies in the open or normal position and the slide for operating the same. Fig. 14 is a still further enlarged detail sectional view through the cutting and double tip forming dies, showing the dies in the open position, a strip of lacing material in the dies, the end of the tip stock in the dies in the position to be cut off and formed around the strip of lacing material and the indenturing dies in the open position.

Figure 15:
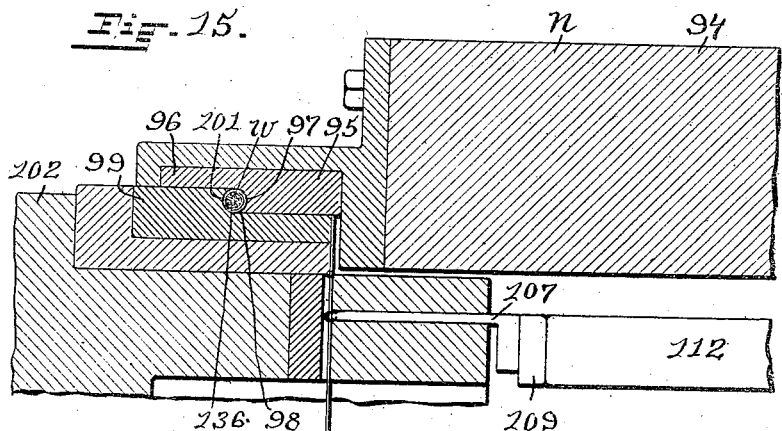

Fig. 15 is an enlarged detail sectional view similar to Fig. 14, showing the dies in the closed position, the piece of tip stock cut off and formed around the strip of lacing material thereby forming a double tip on the same, and the indenturing dies in the closed position to indenture the next piece of tip stock. Fig. 16 is a diagrammatic view, showing the position the strip of lacing material assumes in the machine in forming three complete lacings and partly forming two lacings. Fig. 17 is a detail view of a piece of lacing material, showing the same as it enters the machine. Fig. 18 is a detail view of the lacing material after the dies have formed a double tip on the same, and Fig. 19 is a view of the same after the double tip and lacing has been cut by the cutting mechanism and a tip formed on each end of the severed lacing.

In the drawings, $a$ indicates the frame of the machine, $b$ the bed, $c$ the driving mechanism, $d$ the operating lever, $e$ the lacing feed slide track, $f$ the lacing feed slide, $g$ the lacing feed slide reciprocating mechanism, $h$ the lacing carrying mechanism, $i\ i$ the lacing clamping jaw operating mechanisms, $k\ k$ the lacing holding mechanisms, $l\ l$ the lacing depressing mechanisms, $m$ the lacing carrying intermittent motion mechanism, $n$ the tip forming mechanism, $o$ the tip forming operating mechanism, $p$ the tip stock indenturing mechanism, $r$ the tip stock feed mechanism, $s$ the double tip cutting mechanism, $t$ the tip stock reel, $u\ u$ the adjustable lacing receiving hooks, $v$ a ribbon of thin metal tip stock, $w$ a strip of lacing material, $y$ a completed lacing, 1 the driving shaft, 2 the eccentric shaft, 3 and 4 upper intermediate bevel gear shafts, 5 the lacing carrying mechanism shaft, 6 the front cam shaft, 7 the vertical bevel gear shaft, 8 the lower bevel gear shaft, and 9 the lacing slide reciprocating mechanism shaft, all of said shafts being rotatably supported in bearings in their operative positions in the machine.

The frame $a$ may be of any form adapted to support the bed $b$ and mechanism not supported on the bed.

The bed $b$ is rectangular in form and has the two elongated longitudinal openings 10 10 adjacent the front of the machine for the lacing carrying mechanism $h$, and the transverse opening 11 for the tip stock feed mechanism $r$, as shown in Fig. 1.

The driving mechanism $c$ consists of a pulley 12 secured on the driving shaft 1, a clutch 13 one member of which is secured to the pulley 12 and the other splined to the shaft 1 so that the same revolves with the shaft and may be moved longitudinally on the shaft, and a balance wheel 14 secured to the left hand end of the shaft, which is rotatably supported in bearings secured to the top of the bed at the rear of the machine, as shown in Fig. 1. A train of gears 15, 16 and 17 connects the driving shaft 1 with the eccentric shaft 2, as shown in Figs. 1 and 4, both shafts revolving at the same ratio and in the same direction.

The operating lever $d$ is pivotally secured at its lower end to the bed $b$ and is operatively connected to the movable member of the clutch 13 in the usual way, as shown in full lines in Figs. 1 and 3 and in broken lines in Fig. 5.

The lacing feed track $e$ consists of two inverted L-shaped bars 18 18 which extend the length of the machine at the front and are spaced to form ways for the lacing feed slide $f$. These bars 18 18 are supported above the bed on the brackets 19 19 which in turn are secured to the bed $b$, as shown in Figs. 1, 2 and 4.

The lacing feed slide $f$ has a sliding fit on the track $e$ and is constructed to have a guide eye 20 for the strap of lacing material $w$ and an inwardly-extending guide arm 21 carrying a tension device 22 through which the strip of lacing material $w$ is guided to the lacing carrying mechanism $h$, as shown in Figs. 1 and 4.

The lacing feed slide reciprocating mechanism $g$ consists of a tubular arm 23 pivotally secured at its lower end to the center of the frame $a$ at the front, a rod 24 having a sliding fit in the tubular arm 23 and pivotally secured at its upper end to the bottom of the lacing feed slide $f$, a connecting rod 25 pivotally secured at its inner end to a slide 26 which is adjustably secured to the tubular arm 23 and pivotally and adjustably secured at its outer end to a crank disk 27 through a radial slot in the crank disk, as shown in broken lines in Fig. 2. The crank disk 27 is secured to the shaft 9 which is rotatably supported in bearings in the frame $a$. A train of gears 28, 29 and 30 connects the shaft 9 with the shaft 8 which is rotatably supported in bearings on the lower portion of the frame $a$, as shown in Fig. 4. The shaft 8 is operatively connected with the shaft 7 by the bevel gears 31 and 32 and the shaft 7 is operatively connected with the shaft 2 by the bevel gears 33 and 34. The ratio of the gearing is such that the shaft 9 revolves one-half a revolution to one revolution of the shafts 2, 7 and 8, thereby giving one-half a revolution to the crank disk 27 and through the connecting rod 25, the tubular arm 23 and the rod 24 moves the lacing feed slide $f$ on the track $e$ from one end of the machine to the opposite end in one revolution of the driving shaft 1.

The lacing carrying mechanism $h$ comprises two disks 35 35, each disk being adjustably secured on the shaft 5 adjacent each end of the machine (for different lengths of lacings) and constructed to have a series of seven peripheral notches 36 36 forming seven radial wings 37 37 shaped to hold the strip of lacing material $w$ and around which the strip of lacing material $w$ is carried in feeding the same into the lacing carrying mechanism, as shown in Figs. 1, 4, 8 and 16. A circular frame 38 having a central hub 39 is secured to the shaft 5 by the hub at each inner end of the openings 10 10 in the bed b and each circular frame 38 is constructed to have a concentric circular cavity 40 in its inner face, a series of seven L-shaped lugs 41 41 on its periphery, each lug 41 having a longitudinal peripheral cavity 42, a series of seven radial bores 43 43, each bore 43 extending from the periphery of the circular cavity 40 to a peripheral cavity 42 in a lug 41 and a radial slot 44 extending from the inner face of the frame into each radial bore 43; a series of seven radial guide rods 45 45, each guide rod 45 being secured at its inner end in the hub 39 and at its outer end in a lug 41 and having a slide 46 to which is rotatably secured a roll 47, and a coiled spring 48 on the rod intermediate the hub 39 and the slide 46, a link 49 pivotally secured at its inner end to the slide 46 and at its outer end to a clamping jaw 50 which is pivotally secured to a clamping jaw 51 in the cavity 42 and having a stem 52 in the bore 43.

The inner end of the stem 52 is flush with the periphery of the cavity 40 with the clamping jaws in their normal position, and a pin 53 on the stem in the slot 44 limits the outward movement of the jaws. The tension of the coiled spring 48 holds the clamping jaws 50 and 51 in their closed position and in their outward or normal position in the lug 41. A disk 54 having the top notch 55 and a central hub 56 is held on the shaft 5 in the circular cavity 40 and secured from rotating by a collar 57 which is secured to the hub 56 of the disk 54 and to the fixed front head 102 of the machine, as shown in Figs. 1, 6, 10 and 11.

The lacing clamping jaw operating mechanisms i i are each located adjacent the circular frames 38 38, and each consists of a cam disk 58 secured to the front cam shaft 6 and having a double cam 59 on one side and a roll 60 on the opposite side, a bell crank lever 61 having a roll 62 on its outer end and pivotally secured to the bed b in a position for the roll 62 to engage with the double cam 59 and for the inner end of the lever to engage with a roll 47 on a slide 46 and open the clamping jaws 50 and 51 against the tension of the coiled spring 48, at a predetermined time, to receive the strip of lacing material w, as it is fed into the lacing carrying mechanism h. These bell crank levers 61 61 act simultaneously in both mechanisms to open the clamping jaws when the jaws have reached the required position to receive the strip of lacing material. The rolls 60 60 are placed in oppositely-disposed positions on the cam disks 58 58. A lever 63 in each mechanism is constructed to have a segmental member 64 pivotally secured to its inner end and is pivotally secured adjacent its center to the bed b in a position for the outer end of the lever to engage with the roll 60 on the cam disk 58 and for the segmental member 64 to engage with the two lower rolls 47 47 on the lower slides 46 46 and open the two lower clamping jaws 50 and 51, thereby releasing the ends of the completed lacing. These levers 63 63 act alternately in each mechanism to release the ends of the completed lacings on each side of the machine. A sprocket wheel 65 is secured to the upper bevel gear shaft 4 and is connected to a sprocket wheel 66 on the front cam shaft 6 by a sprocket chain 67, as shown in Figs. 1 and 5. The sprocket wheel 65 is one-half the size of the sprocket wheel 66, thereby giving one-half a revolution to the front cam shaft 6 to one revolution of the upper bevel gear shaft 4 which is revolved at the same ratio as the driving shaft 1 through the bevel gear 68 on the shaft 4 meshing with the bevel gear 69 on the shaft 3, the bevel gear 70 on the shaft 3 meshing with the bevel gear 71 on the shaft 2, and the train of gears 15, 16 and 17 connecting the driving shaft 1 with the eccentric shaft 2, as shown in Fig. 1.

The lacing holding mechanisms k k are each located adjacent the disks 35 35 of the lacing carrying mechanism h at each end of the machine at the front, and each consists of a cam 72 secured to the front cam shaft 6, a lever 73 having a roll 74 on its outer end, a slot 75 in its inner end and pivotally secured at its center to the bed b in a position for the roll 74 to engage with the cam 72 and for the inner end to extend inward under the shaft 5. A clamping slide 76 having the L-shaped end 77 and the pin 78 has a sliding fit in a holding member 79 which is adjustably secured to the under side of the bed b in a position to bring the L-shaped end 77 of the clamping slide 76 centrally against the outer face of a disk 35 and the pin 78 upwards through the slot 75 in the inner end of the lever 73. A pin 80 is secured to the holding member 79 and a coiled spring 81 is connected to the L-shaped end 77 of the clamping slide and to the pin 80, as shown in Fig. 9, the tension of the coiled spring 81 holding the L-shaped end of the clamping slide 76 away from the disk 35. The cam 72 acts to force the L-shaped end 77 of the lever 73 against the face of the disk 35 and clamp or hold the central looped-portion of the lacing between the L-shaped end and the disk until after the tipped ends of the lacing are released from the clamping jaws 50 and 51 in the lacing carrying mechanism h.

The lacing depressing mechanisms l l are located partly over each of the circular frames 38 38 of the lacing carrying mechanisms h h, and each consists of a bent lever 82 pivotally secured adjacent its inner end to the fixed head 93 of the machine in a position for the outer end of the lever to extend over the upper clamping jaws 50 and 51, a reciprocating cam 83 pivotally secured to the head in a position to engage with the inner end of the lever 82, a connecting rod 84 operatively connecting the cam 83 with the tip forming plunger 94 in the head, and a coiled spring 85 connected with the inner end of the lever 82 and with a pin on the head, the tension of the coiled spring 83 holding the inner end of the lever 82 against the cam 83 and the outer end of the lever 82 out of engagement with the clamping jaws 50 and 51, as shown in Fig. 6. On the inward movement of the tip forming plunger 94 the cam 83 operates to depress the outer end of the lever 82 which, engaging with the clamping jaws 50 and 51, moves the clamping jaws and the slide 46 downward against the tension of the coiled spring 48 and depresses the strip of lacing material $w$ into the tip forming die member on the front head. As the clamping jaws 50 and 51 are forced downward the end of the stem 52 enters the notch 55 in the periphery of the disk 54, as shown in broken lines in Fig. 11. On the next intermittent rotary movement of the lacing carrying mechanism $h$ the end of the stem 52 is forced out of the notch 55 onto the periphery of the disk 54, thereby moving the clamping jaws outward and holding the same in the receiving or normal position, as shown in Figs. 6 and 10, irrespective of the action of the coiled spring 48.

The lacing carrying intermittent motion mechanism $m$ consists of a disk 86 secured to the outer end of the upper bevel gear shaft 4 and having a circular hub 87 with a concaved cut-away portion 88 in its periphery and a pin 89 extending out from the face of the disk opposite the cut-away portion 88, and a disk 90 secured to the adjacent end of the shaft 5 and having a series of seven radial slots 91 91 extending inward from the periphery and forming seven intermediate wings 92 92, the peripheral faces of which are concaved to coincide with the periphery of the hub 87 on the disk 86, as shown in Fig. 5. One revolution of the disk 86 through the pin 89 engaging with a slot 91 in the disk 90 gives an intermittent rotary motion movement to the shaft 5 and the lacing carrying mechanism $h$ of one-seventh of a revolution, and the hub 87 engaging with the concaved face of a wing 92 locks the lacing carrying mechanism $h$ during the tip forming and cutting operations.

The tip forming mechanism $n$ consists of a head 93 supporting a horizontal reciprocating plunger 94 and secured centrally to the bed $b$ at the inner edge of the openings 10 10, as shown in Fig. 1. A reciprocating die 95 is secured to the forward end of the plunger 94 and is constructed to have a forwardly-projecting end 96 and a semi-circular under recess 97 which extends transversely across the die and forms a transverse cutting edge 98. A fixed die 99 having a depressed face 100 merging forwardly into a semi-circular recess 101 which extends transversely across the die, is secured to a front head 102 which is secured to the bed $b$ intermediate the openings 10 10 and in a position to bring the fixed die 99 into alinement with the reciprocating die 95, as shown in Fig. 12. The semi-circular recesses 97 and 101 form a circular bore when the dies are closed. The forwardly-projecting end 96 of the reciprocating die 95 in its forward movement strikes the end of the tip stock $v$ and bends it over into the semi-circular recess 101 in the fixed die 99, as shown in Fig. 14. The cutting edge 98 on the reciprocating die 95 now cuts off the double tip blank and the semi-circular recesses 98 and 101 in the dies form a double tip from the tip blank by forcing the tip blank around and compressing the same onto the strip of lacing material $w$, as shown in Fig. 15.

The tip forming operating mechanism $o$ consists of an eccentric 103 on the driving shaft 1 and having a connecting rod 104 pivotally secured to the rear end of the plunger 94, as shown in Figs. 1 and 6. One revolution of the eccentric 103 gives one complete reciprocating movement to the plunger 94.

The tip stock indenturing mechanism $p$ consists of a fixed die 105 having the indentures 106 106 and secured in a vertical position in the top of the front head 102, a horizontal reciprocating die 107 having the teeth 108 108 coinciding with the indentures 106 106 in the fixed die 105 and reciprocally supported in the top of the front head 102 in alinement with the fixed die 105, as shown in Figs. 12 and 13. The reciprocating die 107 is secured to a cross bar 109 which is reciprocally supported on two studs 110 110 secured to the front head 102, each stud having a coiled spring 111 intermediate the cross bar 109 and the front head 102, as shown in Fig. 13. The tension of the coiled springs 111 111 holds the reciprocating die 107 in its open or normal position. A slide 112 is reciprocally supported in the head 93 in alinement with the indenturing dies. Two coiled springs 113 113 in cavities in the head 93 are attached at one end to the forward end of the slide 112 and at their inner ends to the head 93, as shown in Fig. 13, and a pin 114 is secured to the plunger 94 in a position to engage with the rear end of the slide 112, as shown in Fig. 6. A forward movement of the plunger 94 to form a double tip causes the pin 114 on the plunger to engage with the rear end of the slide 112 and move the slide forward, which engaging with and moving the reciprocating die 107, forces the points 108 108 on the die into the tip stock, thus forming points on the inside of the tips to assist in securing the tips to the lacings. On the reverse movement of the plunger 94 the tension of the coiled springs 113 113 returns the slide 112 to its normal position.

The tip stock feed mechanism r comprises two feed rolls 115 115 rotatably supported in bearings in a cavity in the front head 102 and in a position to feed the ribbon of tip stock v upwards through the indenturing dies 105 and 107 to the tip forming dies 95 and 99. A train of gears 116, 117 and 118, as shown in broken lines in Fig. 12, operatively connects the feed rolls 115 115 with a shaft 119 rotatably supported in the front head 102. A ratchet gear 120 is secured to the opposite end of the shaft 119 and a pawl lever 121 having a pawl 122 is pivotally supported on the shaft 119 in a position for the pawl 122 to engage with the ratchet gear 120. A connecting rod 123 is pivotally connected to the forward end of the pawl lever 121 and to the forward end of a bell crank lever 124 which is pivotally secured to the underside of the bed b. A connecting rod 125 is pivotally connected to the lower end of the bell crank lever 124 and to the lower end of a vertical lever 126 which extends upward through the opening 11 in the bed b and is pivotally secured to the bed, and a connecting rod 127 is pivotally connected to the upper end of the vertical lever 126 and to an eccentric 128 on the driving shaft 1, as shown in Figs. 1 and 7. By this construction, for each revolution of the eccentric 128 the feed rolls 115 115 are revolved to feed the ribbon of tip stock v from the reel t to the tip forming dies 95 and 99 a distance the equivalent of one double tip.

The tip cutting mechanism s consists of two cutter blades 129 129, each blade having the oppositely-disposed V-shaped cutting edges 130 130 on their upper forward ends, and reciprocally supported in a horizontal position in the head 93 under the plunger 94, as shown in Fig. 12. Connecting rods 131 131 are pivotally connected to the rear ends of the cutter blades 129 129 and to eccentrics 132 132 secured in oppositely-disposed positions on the eccentric shaft 2, as shown in Figs. 1 and 6. By this construction the cutter blades 129 129 are given a reciprocating motion in opposite directions and are timed to cut the double tip centrally to form a tip on each end of the severed lacing simultaneously with the forming of a double tip on the strip of lacing material.

The tip stock reel t is rotatably supported in a bracket 133 secured to the bed b at the rear in a position to feed the ribbon of tip stock v to the feed rolls 115 115, as shown in Figs. 3, 6 and 12.

The lacing receiving hooks u u each consists of a shank 134 having a hook-shaped end 135 and adjustably secured to the holding member 79 at each end of the machine in a position for the hook-shaped end 135 to come under a disk 35 of the lacing carrying mechanism h, as shown in Fig. 9, and receive the looped lacing when released from the lacing holding mechanisms k k.

The tip stock v is in the form of a thin metal ribbon the width of which forms the length of a double tip 136, as shown in Fig. 18, which when cut centrally by the tip cutting mechanism s forms a finished tip 137 on each end of the severed lacing material w, as shown in Fig. 19.

In the operation of my improved automatic machine for manufacturing shoe, corset or similar lacings, the driving mechanism c is driven by a belt on the pulley 12 in the usual way. The tip stock v is fed by the tip stock feed mechanism r intermittently through the indenturing dies 105 and 107 to the tip forming dies 95 and 99 of the tip forming mechanism n. The continuous strip of lacing material w is brought preferably from a can on the floor (not shown) in which it is coiled, passed through the guide eye 20 and the tension device 22 on the lacing feed slide f and the end secured in the lacing carrying mechanism h. The operations of reciprocally feeding the strip of lacing material applying the double tip to the strip of lacing material, cutting a double tip centrally and releasing a completed lacing are all performed simultaneously in one revolution of the driving shaft. Starting with the operative parts in the positions as shown in the drawings, the lacing carrying mechanism h is locked in the receiving, tip forming and tip cutting position by the lacing carrying intermittent motion mechanism m, the lacing clamping jaws operating mechanisms i i both operating to open the two sets of clamping jaws 50 and 51 of the lacing carrying mechanism h which lie in the path in which the strip of lacing material is fed. The lacing feed slide reciprocating mechanism g operates to move the lacing feed slide f to the left to a point slightly beyond the disk 35 in the lacing carrying mechanism h which carries the strip of lacing material around one of the wings 37 on the right hand disk 35 and through the clamping jaws 50 and 51. The clamping jaws now close automatically onto the strip of lacing material and hold the same, as shown in Figs. 10 and 11. The lacing carrying mechanism h is revolved one-seventh of a revolution and locked by the lacing carrying intermittent motion mechanism m to bring the strip of lacing material over the fixed tip forming die 99. The clamping jaws 50 and 51 are depressed by the lacing depressing mechanisms l l to lower the strip of lacing material into the fixed tip forming die 99. The tip forming mechanism n is operated by the tip forming operating mechanism o to form a double tip on the strip of lacing material. The lacing feed slide f is moved to the right and slightly beyond the right hand disk 35 which carries the strip of lacing material around one of the wings 37 on the left hand disk 35 and through the next set of open clamping jaws 50 and 51 which close and hold the strip of lacing material.

The lacing carrying mechanism $h$ is revolved one-seventh of a revolution to bring the strip of lacing material into the cutter blades 130 130 of the tip cutting mechanism $s$ which are operated to cut the double tip centrally and sever the strip of lacing material, thereby forming a finished tip on the severed ends of the lacing material. The tipped ends of the lacings are still held by the clamping jaws 50 and 51 for three intermittent rotary movements of the lacing carrying mechanism $h$ or until the same have reached their lowest positions. The lacing holding mechanisms $k$ $k$ operate alternately to hold the looped portions of the lacings between a wing 37 on a disk 35 and an L-shaped end 77 of a clamping slide 76 until the clamping jaws 50 and 51 are alternately opened by the lacing clamping jaws operating mechanisms $i$ $i$ and the lacings allowed to drop down into the position, as shown in broken lines in Fig. 9. The clamping slide 76 is now released and through the tension of the coiled spring 81 moves outward, thereby releasing the lacings and allowing the same to drop alternately onto a lacing receiving hook $u$ at each end of the machine. These operations, which are practically simultaneous and continuous, may be repeated indefinitely.

The machine may be adjusted for different lengths of lacings by adjusting the disks 35 35 of the lacing receiving mechanism $h$ lengthwise on the shaft 5, adjusting the throw of the lacing feed slide $f$ by adjusting the slide 26 on the tubular arm 23 of the lacing feed slide reciprocating mechanism $g$, adjusting the lacing holding mechanisms $k$ $k$ to correspond to the disks 35 35 and adjusting the position of the lacing receiving hooks $u$ $u$ to correspond to the location of the disks 35 35.

Having thus described my invention, I claim as new and desire to secure by Letters Patent:

1. In a machine for manufacturing lacings, means for feeding and doubling a strip of lacing material in the machine, means for holding the looped ends of the doubled lacing material, means for holding the doubled lacing material intermediate the looped ends, and means for giving an intermittent rotary movement to the doubled strip of lacing material.

2. In a machine for manufacturing lacings, means for feeding and doubling a strip of lacing material in the machine, means for holding the doubled strip of lacing material, means for giving an intermittent rotary motion to the doubled strip of lacing material, and means for applying a double tip to the doubled strip of lacing material.

3. In a machine for manufacturing lacings, means for feeding and doubling a strip of lacing material, means for holding the doubled lacing material, means for giving an intermittent rotary motion to the doubled lacing material, means for applying a double tip to the doubled lacing material, and means for cutting the double tip centrally.

4. In a machine for manufacturing lacings, means for feeding and doubling a strip of lacing material, means for holding the doubled lacing material, means for giving an intermittent rotary motion to the doubled lacing material, means for applying a double tip to the doubled lacing material, means for cutting the double tip centrally and severing the lacing material, means for releasing the completed lacings, and means for receiving the finished lacings.

5. In a machine for manufacturing lacings, a driving mechanism, a lacing feed mechanism adapted to reciprocally feed a strip of lacing material into the machine, means for receiving and doubling predetermined lengths of the strip of lacing material, and means for operatively connecting the lacing feed mechanism with the driving mechanism.

6. In a machine for manufacturing lacings, a driving mechanism, a lacing feed mechanism adapted to reciprocally feed a strip of lacing material, a lacing carrying mechanism adapted to continuously receive, double and hold the doubled lacing material, an intermittent motion mechanism operatively connected with and adapted to give an intermittent rotary movement to the lacing carrying mechanism, means for operatively connecting the lacing feed mechanism with the driving mechanism, and means for operatively connecting the intermittent motion mechanism with the driving mechanism.

7. In a machine for manufacturing lacings, a frame, a bed on the frame, a driving mechanism on the bed, a lacing feed mechanism adapted to reciprocally feed a strip of lacing material, a lacing carrying mechanism adapted to continuously double and hold the doubled lacing material, an intermittent motion mechanism operatively connected with and adapted to give an intermittent rotary movement to the lacing carrying mechanism, a tip forming mechanism adapted to form a double tip on the doubled lacing material, a tip cutting mechanism adapted to cut the double tip centrally and sever the lacing material, means for operatively connecting the lacing feed mechanism with the driving mechanism, means for operatively connecting the intermittent motion mechanism with the driving mechanism, means for operatively connecting the tip forming mechanism with the driving mechanism, and means for operatively connecting the tip cutting mechanism with the driving mechanism.

8. In a machine for manufacturing lacings, a frame, a bed on the frame, a driving mechanism, a lacing carrying mechanism comprising a shaft rotatably supported in bearings on the bed, two spaced disks on the shaft each disk having a series of peripheral notches forming a series of radial wings, a lacing feed mechanism adapted to reciprocally feed a strip of lacing material to the lacing carrying mechanism, means for giving an intermittent rotary motion to the lacing carrying mechanism, and means for operatively connecting the lacing feed mechanism with the driving mechanism.

9. In a machine for manufacturing lacings, a frame, a bed on the frame, a driving mechanism, a lacing carrying mechanism comprising a shaft rotatably supported in bearings on the bed, two spaced disks on the shaft each disk having a series of peripheral notches forming a series of intermediate radial wings, two circular frames on the shaft intermediate the disks, a series of clamping jaws on the frames adapted to automatically clamp and hold a strip of lacing material, a lacing feed mechanism adapted to reciprocally feed a strip of lacing material to the lacing carrying mechanism, means for giving an intermittent rotary motion to the lacing carrying mechanism, and means for operatively connecting the lacing feed mechanism with the driving mechanism.

10. In a machine for manufacturing lacings, a frame, a bed on the frame, a driving mechanism, a lacing carrying mechanism comprising a shaft rotatably supported on the bed, two spaced disks on the shaft each disk having a series of peripheral notches forming a series of radial wings, a track on the bed, a slide on the track adapted to feed a strip of lacing material to the lacing carrying mechanism, a reciprocating lacing feed mechanism operatively connected with the slide and adapted to give a reciprocating motion to the slide, means for giving an intermittent rotary motion to the lacing carrying mechanism, and means for operatively connecting the reciprocating lacing feed mechanism with the driving mechanism.

11. In a machine for manufacturing lacings, a frame, a bed on the frame, a driving mechanism, a lacing carrying mechanism comprising a shaft rotatably supported on the bed, spaced disks on the shaft each disk having a series of peripheral notches forming a series of radial wings, an intermittent motion mechanism operatively connected with the shaft and with the driving mechanism and adapted to give an intermittent rotary motion to the lacing carrying mechanism, a track on the bed, a slide on the track adapted to alternately feed a strip of lacing material around the wings on the disks, a reciprocating lacing feed mechanism operatively connected with and adapted to give a reciprocating motion to the slide, and means for operatively connecting the reciprocating lacing feed mechanism with the driving mechanism.

12. In a machine for manufacturing lacings, a frame, a bed on the frame, a driving mechanism, a lacing carrying mechanism comprising a shaft rotatably supported on the bed, spaced disks on the shaft each disk having a series of peripheral notches and intermediate radial wings, circular frames on the shaft intermediate the disks, a series of clamping jaws on the circular frames adapted to automatically hold a strip of lacing material for a predetermined period, a lacing depressing mechanism adapted to give a reciprocating radial movement to the clamping jaws, means for giving an intermittent rotary movement to the lacing carrying mechanism, and means for operatively connecting the lacing depressing mechanism with the driving mechanism.

13. In a machine for manufacturing lacings, a frame, a bed on the frame, a driving mechanism, a lacing carrying mechanism comprising a shaft rotatably supported on the bed, spaced disks on the shaft each disk having a series of peripheral notches and intermediate radial wings, a lacing holding mechanism adapted to hold the looped portion of a lacing on a radial wing of a disk for a predetermined period, means for giving an intermittent rotary movement to the lacing carrying mechanism, and means for operatively connecting the lacing holding mechanism with the driving mechanism.

14. In a machine for manufacturing lacings, a frame, a bed on the frame, a driving mechanism, a lacing carrying mechanism comprising a shaft rotatably supported on the bed, spaced disks on the shaft each disk having a series of peripheral notches and intermediate radial wings, circular frames on the shaft intermediate the disks, a series of clamping jaws on the circular frames adapted to hold a strip of lacing material on the ends of a lacing for a predetermined period, means for operating the clamping jaws, means for giving a radial reciprocating movement to the clamping jaws, a lacing holding mechanism adapted to hold the looped portion of a lacing on a radial wing of a disk for a predetermined period, means for giving an intermittent rotary movement to the lacing carrying mechanism, means for operatively connecting the lacing holding mechanism with the driving mechanism, and means for reciprocally feeding a strip of lacing material to the disks of the lacing carrying mechanism.

15. In a machine for manufacturing lacings, a frame, a bed on the frame, a driving mechanism, a lacing carrying mechanism comprising a shaft rotatably supported on the bed, spaced disks on the shaft having a series of peripheral notches and radial wings, circular frames on the shaft intermediate the disks, a series of clamping jaws on the circular frames adapted to hold a strip of lacing material on the ends of a lacing for a predetermined period, means for operating the clamping jaws, means for giving a radial reciprocating movement to the clamping jaws, a double tip forming mechanism operatively connected with the driving mechanism, means for feeding tip stock to the tip forming mechanism, means for indenturing the tip stock, a lacing holding mechanism adapted to hold the looped portion of a lacing on a radial wing of a disk for a predetermined period, means for giving an intermittent rotary movement to the lacing carrying mechanism, means for operatively connecting the lacing holding mechanism with the driving mechanism, means for reciprocally feeding a strip of lacing material to the lacing carrying mechanism, and means for receiving the completed lacings.

16. In a machine for manufacturing lacings, the combination of the following instrumentalities: A frame $a$, a bed $b$ supported on the frame, a driving mechanism $c$ on the bed, an operating lever $d$, a lacing feed track $e$ on the bed, a lacing feed slide $f$ on the track, a lacing feed slide reciprocating mechanism $g$ operatively connected with the feed slide $f$ and with the driving mechanism $c$, a lacing carrying mechanism $h$ adapted to double and hold a strip of lacing material and having a series of clamping jaws, operating mechanism $i$ $i$ operatively connected with the clamping jaws and with the driving mechanism, lacing holding mechanism $k$ $k$ operatively connected with the lacing carrying mechanism $h$ and with the driving mechanism $c$, lacing depressing mechanism $l$ $l$ operatively connected with the clamping jaws and with the driving mechanism, a lacing carrying intermittent motion mechanism $m$ operatively connected with the lacing carrying mechanism $h$ and with the driving mechanism $c$ to give an intermittent rotary motion to the lacing carrying mechanism $h$, a tip forming mechanism $n$ adapted to form a double tip on a strip of lacing material, a tip forming operating mechanism $o$ operatively connected with the tip forming mechanism $n$ and with the driving mechanism $c$, a tip stock indenturing mechanism $p$ operatively connected with the driving mechanism $r$ operatively connected with the driving mechanism $c$, a tip cutting mechanism $s$ operatively connected with the driving mechanism $c$ and adapted to cut a double tip centrally and sever the lacing material, a tip stock feed reel $t$ rotatably secured to the machine, lacing receiving hooks adjustably secured at each end of the machine, and means for adjusting the machine for different lengths of lacings, as described.

In testimony whereof I have signed my name to this specification in the presence of two subscribing witnesses.

WILLIAM H. CHURCH.

Witnesses:
 ADA E. HAGERTY,
 J. A. MILLER.